US012335862B2

United States Patent
Majumder et al.

(10) Patent No.: US 12,335,862 B2
(45) Date of Patent: Jun. 17, 2025

(54) SYSTEM AND METHOD FOR SELECTING A TARGET ACCESS POINT FOR ROAMING

(71) Applicant: ZEBRA TECHNOLOGIES CORPORATION, Lincolnshire, IL (US)

(72) Inventors: Darpan Majumder, Bangalore (IN); Venkata Aneel Kumar Inuganti, Bangalore (IN); Mahesh Kumar Edar, Davenagere (IN); Surya Kantha Rao Kandoti, Bangalore (IN); Chiranjeevi Kamakshipalya Hanumanthaiah, Bangalore (IN); Naga Babu Parsi, Bangalore (IN); Kishore Kumar Pathankanur, Bangalore (IN); Mahendiran Balasubramaniyam, Erode (IN); HariPrasad Mosuru Chandrasekhar, Erode (IN); Phanindra Kumar Gollapudi, Bangalore (IN); Punith Gangadhara, Davanagere (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 351 days.

(21) Appl. No.: 17/882,024

(22) Filed: Aug. 5, 2022

(65) Prior Publication Data

US 2024/0049126 A1 Feb. 8, 2024

(51) Int. Cl.
H04W 48/20 (2009.01)
H04W 48/00 (2009.01)
(Continued)

(52) U.S. Cl.
CPC .......... *H04W 48/20* (2013.01); *H04W 48/04* (2013.01); *H04W 48/17* (2013.01); *H04W 72/542* (2023.01); *H04W 4/80* (2018.02)

(58) Field of Classification Search
CPC ... H04W 72/542; H04W 48/17; H04W 48/20; H04W 48/04; H04W 4/80
See application file for complete search history.

(56) References Cited

U.S. PATENT DOCUMENTS

| 2015/0098392 A1* | 4/2015 | Homchaudhuri | H04W 48/20 370/329 |
| 2015/0296431 A1* | 10/2015 | Li | H04W 36/08 370/331 |

(Continued)

*Primary Examiner* — Andrew Lee

(57) ABSTRACT

A mobile computing device comprising: a wireless communications interface configured to connect to a network deployed by a plurality of access points; a short-range wireless communications interface configured to communicate with one or more nearby computing devices; a processor interconnected with the wireless communications interface and the short-range wireless communications interface, the processor configured to: obtain, from the one or more nearby computing devices via the short-range wireless communications interface, a list of potential access points, wherein each potential access point comprises one of the plurality of access points by which a respective nearby computing device is connected to the network; select one of the potential access points as a target access point, wherein the target access point is different from a home access point to which the wireless communications interface is currently connected; and control the wireless communications interface to roam to the selected target access point.

18 Claims, 5 Drawing Sheets

(51) Int. Cl.
*H04W 48/04* (2009.01)
*H04W 72/542* (2023.01)
*H04W 4/80* (2018.01)

(56) References Cited

U.S. PATENT DOCUMENTS

| | | | | |
|---|---|---|---|---|
| 2015/0350875 | A1* | 12/2015 | Chhabra | H04W 36/00835 455/432.1 |
| 2016/0081009 | A1* | 3/2016 | Tailor | H04W 48/16 455/432.1 |
| 2018/0295548 | A1* | 10/2018 | Kumar | H04W 36/008375 |
| 2020/0128610 | A1* | 4/2020 | Cheng | H04W 76/15 |
| 2020/0383045 | A1* | 12/2020 | Kumar | H04W 48/20 |
| 2021/0410055 | A1* | 12/2021 | Tabatabaie | H04W 88/10 |
| 2022/0322219 | A1* | 10/2022 | Gandhi | H04W 76/15 |
| 2023/0397098 | A1* | 12/2023 | Nix | H04W 36/304 |

\* cited by examiner

SYSTEM AND METHOD FOR SELECTING A TARGET ACCESS POINT FOR ROAMING

BACKGROUND

Wireless networks may be serviced by several access points to which mobile devices can connect based on their location within the wireless network. As users of mobile devices move around, the mobile devices may scan for different access points to which to connect and roam to access points with better connections. However the scanning process causes the mobile device to move away from the home access point, disrupting transmission and potentially causing data packets to be lost.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
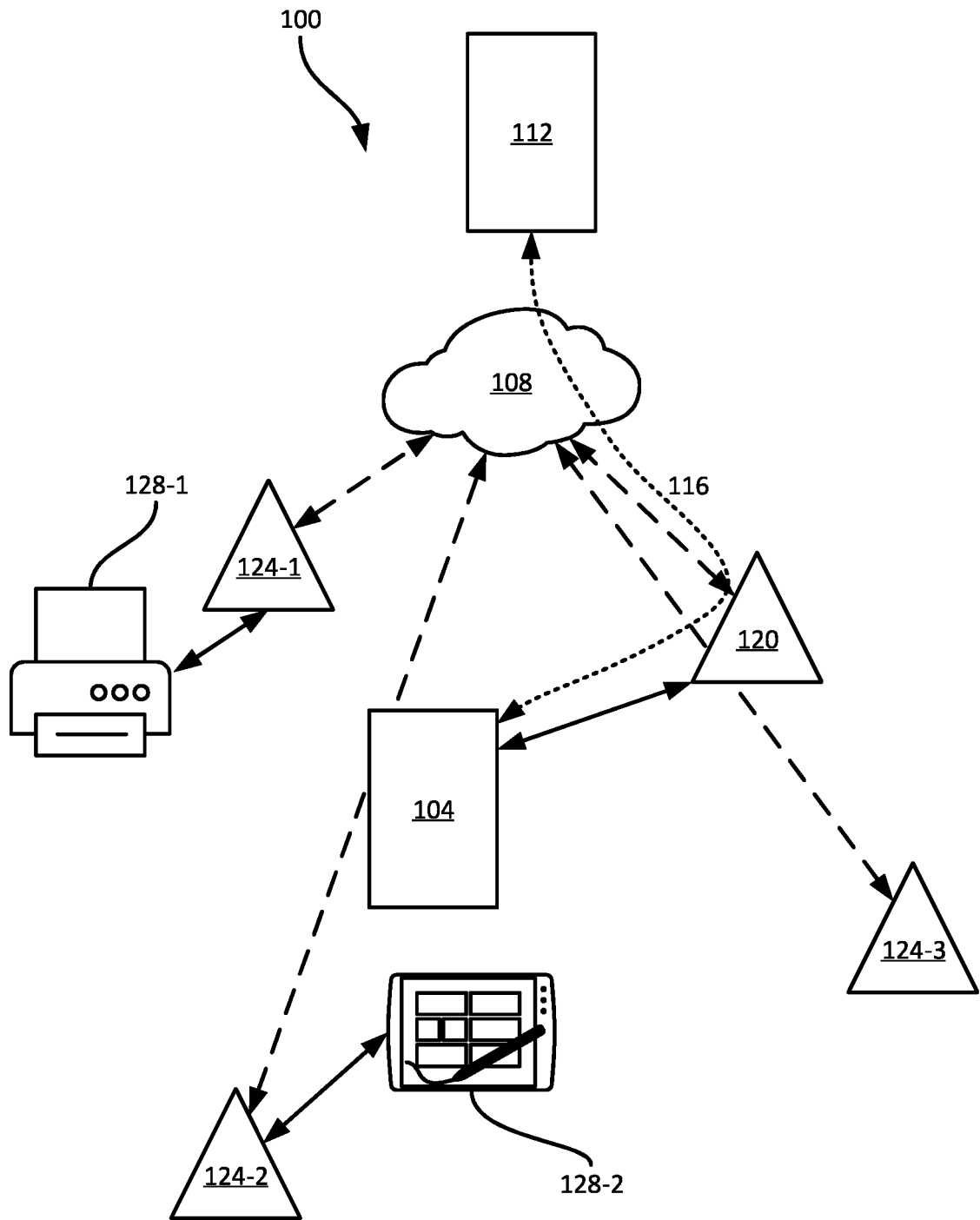
FIG. 1 is a schematic diagram of a system for selecting a target access point for roaming.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device comprising: a wireless communications interface configured to connect to a network deployed by a plurality of access points; a short-range wireless communications interface configured to communicate with one or more nearby computing devices; a processor interconnected with the wireless communications interface and the short-range wireless communications interface, the processor configured to: obtain, from the one or more nearby computing devices via the short-range wireless communications interface, a list of potential access points, wherein each potential access point comprises one of the plurality of access points by which a respective nearby computing device is connected to the network; select one of the potential access points as a target access point, wherein the target access point is different from a home access point to which the wireless communications interface is currently connected; and control the wireless communications interface to roam to the selected target access point.

Additional examples disclosed herein are directed to a method comprising: obtaining, from one or more nearby computing devices via a short-range wireless communications interface, a list of potential access points, wherein each potential access point comprises one of a plurality of access points by which a respective nearby computing device is connected to the network; selecting one of the potential access points as a target access point, wherein the target access point is different from a home access point to which the mobile computing device is currently connected; and roaming to the selected target access point.

Additional examples disclosed herein are directed to a non-transitory computer-readable medium storing a plurality of computer-readable instructions executable by a processor of a mobile computing device, wherein execution of the instructions configures the processor to: obtain, from one or more nearby computing devices via a short-range wireless communications interface, a list of potential access points, wherein each potential access point comprises one of a plurality of access points by which a respective nearby computing device is connected to a network deployed the access point; select one of the potential access points as a target access point, wherein the target access point is different from a home access point to which the mobile computing device is currently connected; and roam to the selected target access point.

FIG. 1 depicts a system 100 for selecting a target access point for roaming in accordance with the teachings of this disclosure. The system 100 includes a mobile computing device 104 (also referred to herein as simply the device 104) connected to a network 108. The device 104 may communicate with a second computing device 112 via a link 116 which traverses the network 108. In some examples, the device 112 may be remote from the device 104 and the link 116 may therefore additionally traverse one or more wide-area networks such as the Internet, mobile networks and the like.

The device 104 may be a mobile computing device such as a handheld computer, a mobile phone, a tablet, a barcode scanner, or the like. As noted above, the device 104 is connected to the network 108, which may be deployed for wireless communications within a facility, such as a transportations and logistics facility, a warehouse, retail establishment, or other facility. Accordingly, the network 108 may be a wireless local area network (WLAN) deployed by one or more access point. In the present example, four example access points, a home access point 120, and three foreign access points 124-1, 124-2, and 124-3 are depicted. In other examples, the network 108 may include more or fewer access points.

In particular, the device 104 may be currently serviced by the home access point 120 to connect to the network 108. Since the device 104 is mobile, the device 104 may be carried about by a user. As the user of the device 104 moves about the facility or other region serviced by the network 108, the connection of the device 104 to the home access point 120 may weaken, and the device 104 may be better serviced by another foreign access point 124 of the network 108. Accordingly, the device 104 may roam to one of the foreign access points 124 to connect to the network 108, for example when the device 104 is out of range of the home access point 120 and/or when a better connection may be achieved via one of the foreign access points 124.

In typical systems, to roam to a foreign access point 124 from the home access point 120, the device 104 may periodically scan for foreign access points 124 to which it may connect. For example, in the presently illustrated example, the device 104 is closer to the access point 124-1, and hence a scan for foreign access points may select the access point 124-1 as a new access point to utilize to connect to the network 108. While the device 104 scans for foreign access points 124, the device 104 may temporarily move away from the home access point 120, and hence any communications and data transmissions to and from the device 104 may be temporarily disrupted.

Accordingly, in accordance with the present disclosure, as will be described further herein, rather than moving away from the home access point 120 to scan for the foreign access points 124, the device 104 may obtain a list of potential access points from nearby computing devices 128-1 and 128-2. The nearby computing devices 128 may be computing devices such as printers, laptops, desktop computers, fixed workstations, other mobile computing devices, such as scanners, tablets, mobile phones, or the like. In particular, the nearby computing devices 128 may each be connected to an access point as well. In the present example, device 128-1 is connected to the foreign access point 124-1, while device 128-2 is connected to access point 124-2. The device 104 may communicate with the device 128 by a different communications protocol, such as a short-range communications protocol (e.g., Bluetooth low energy, etc.), which does not interfere with the connection to the access points 120 or 124. The device 104 may then select one of the potential access points as a target access point to which to roam.

Thus, rather than moving away from the home access point 120 to perform the scan to select a new access point to which to roam, the device 104 may select a target access point while maintaining connection to the home access point 120. After selecting the target access point to which to roam, the device 104 may move away from the home access point 120 to roam to the selected target access point.

Figure 2:
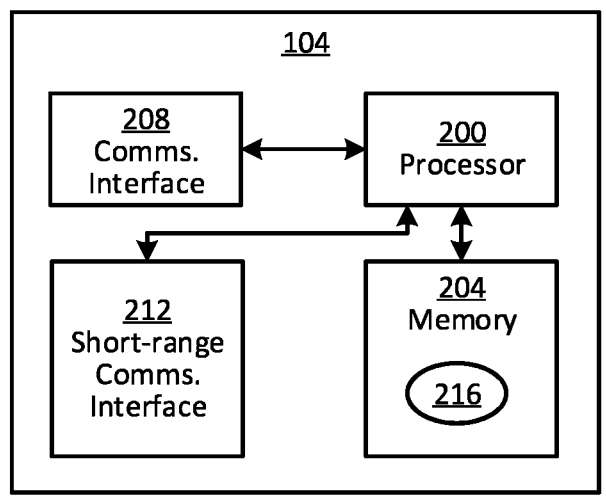
FIG. 2 is a block diagram of certain internal hardware components of the mobile computing device of FIG. 1.

Turning now to FIG. 2, certain internal components of the computing device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The device 104 further includes a communications interface 208 enabling the device 104 to exchange data with other computing devices, such as the device 112. The communications interface 208 is interconnected with the processor 200. The communications interface 208 includes a controller, and one or more antennas, transmitters, receivers, or the like (not shown), to allow the device 104 to communicate with other computing devices such as the device 112 via the link 116.

The device 104 further includes a short-range wireless communications interface 212 enabling the device to exchange data with other computing devices, such as the devices 128, via a short-range wireless communications protocol, such as Bluetooth. The short-range wireless communications interface 212 is also interconnected with the processor 200 and may include a controller, one or more antennas, transmitters, receivers, or the like (not shown), to allow the device 104 to communicate with other computing devices such as the devices 128 via the short-range wireless communications protocol.

In some examples, the communications interface 208 and the short-range wireless communications interface 212 may be integrated with one another, rather than implemented as separate components.

The memory 204 stores computer-readable instructions for execution by the processor 200. The memory 204 may also store rules and data for the access point selection operation. In particular, the memory 204 stores an application 216 which, when executed by the processor, configures the processor 200 to perform various functions discussed below in greater detail and related to the access point selection operation of the device 104. The application 216 may also be implemented as a suite of distinct applications.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the operations discussed herein.

The device 104 may further include one or more input and/or output devices (not shown) suitable to allow an operator to interact with the device 104. The input devices may include one or more buttons, keypads, touch-sensitive display screens or the like for receiving input from an operator. The output devices may further include one or more display screens, sound generators, vibrators, or the like for providing output or feedback to an operator.

Figure 3:
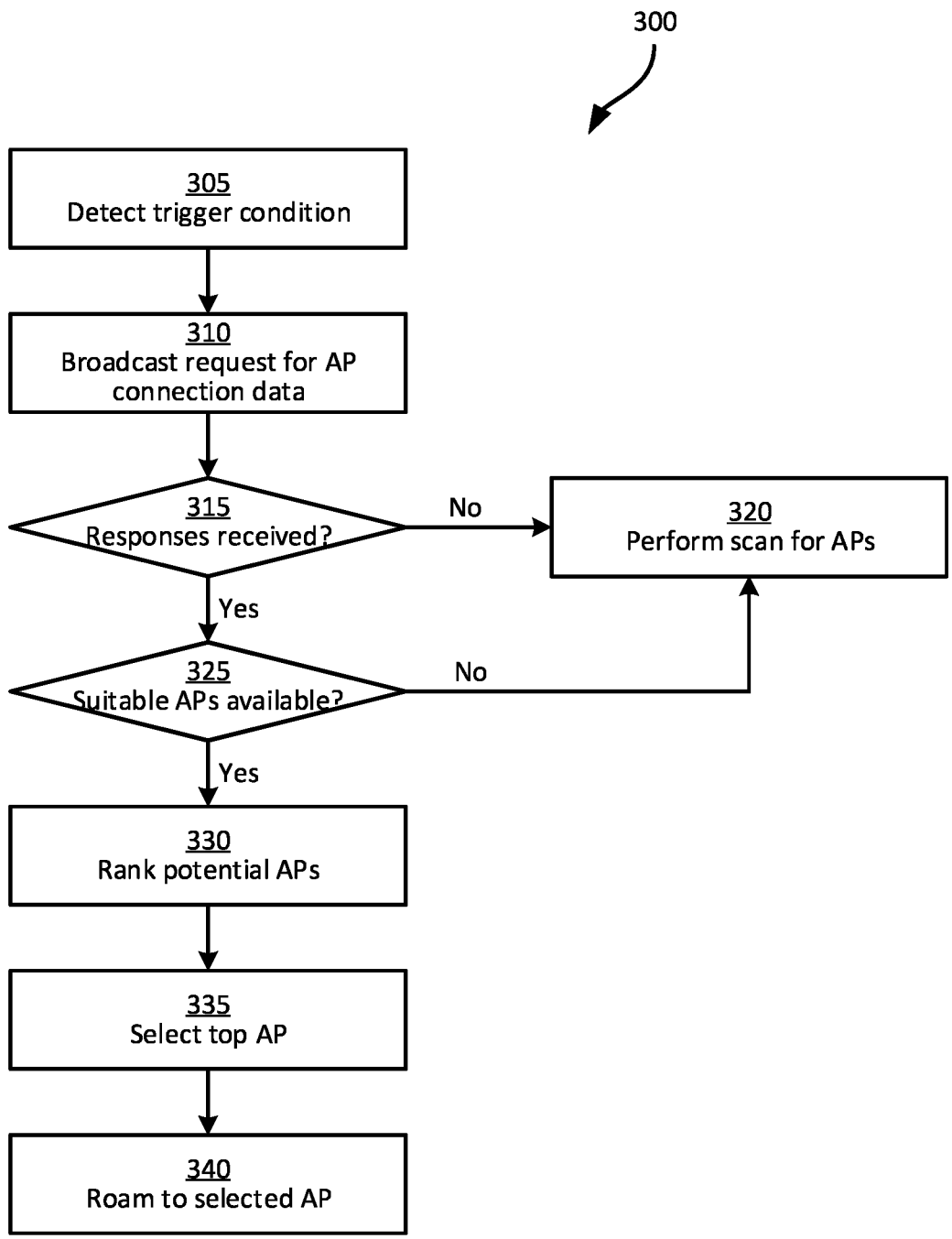
FIG. 3 is a flowchart of a method for selecting a target access point for roaming.

Turning now to FIG. 3, the functionality implemented by the device 104 will be discussed in greater detail. FIG. 3 illustrates a method 300 of selecting a target access point for roaming. The method 300 will be discussed in conjunction with its performance in the system 100, and particularly by the device 104, via execution of the application 216. In particular, the method 300 will be described with reference to the components of FIGS. 1 and 2. In other examples, the method 300 may be performed by one or both of the controllers of the wireless communications interface 208 and the short-range wireless communications interface 212, and/or by other suitable devices.

The method 300 is initiated at block 305, when the device 104 detects a trigger condition to begin identifying another access point to roam to. For example, the trigger condition may be detecting that a signal strength to the home access point 120 is below a threshold strength. In some examples, this threshold strength (or the trigger condition more generally) may be the same as the condition to initiate a roam scan. In other examples, the threshold strength (or the trigger condition more generally) may be higher than the condition to initiate a roam scan, so that the device 104 may attempt to select a target access point for roaming via the present method 300 prior to triggering the condition to initiate a roam scan.

In response to detecting the trigger condition, or in particular, that the signal strength to the home access point 120 is below a threshold strength, the device 104 initiates a process to obtain a list of potential access points. In particular, at block 310, the device 104 broadcasts a request for access point connection data from the nearby computing devices 128 via the short-range wireless communications interface. For example, the request may be broadcast over Bluetooth to other nearby Bluetooth devices. The request may be for the nearby computing devices 128 to provide to the device 104 an access point identifier of the access point 124 by which the respective computing device 128 is connected to the network 108 and a network signal strength indicator representing the network signal strength between the computing device 128 and the access point 124 to which it is connected. The access point connection data received from the nearby computing devices 128 may therefore contain similar data as scan data obtained by performing a scan for suitable access points 124. This allows the device 104 to use the access point connection data in the same manner as scan data to roam to a given access point identified by the access point connection data.

Figure 4:
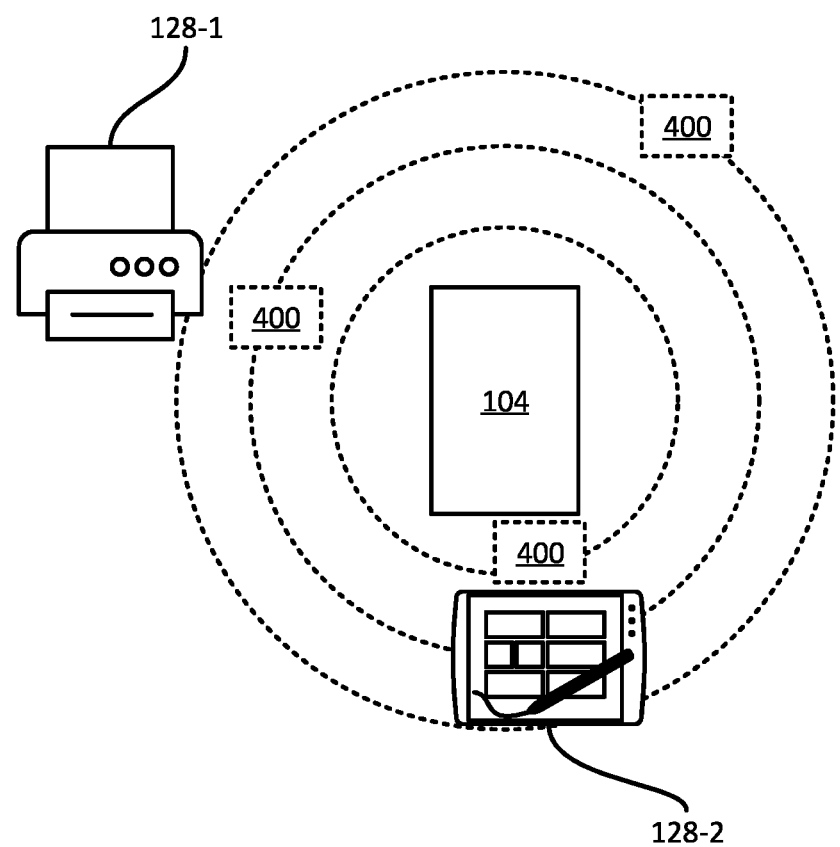
FIG. 4 is a schematic diagram of an example performance of block 310 of the method of FIG. 3.

For example, FIG. 4 depicts a schematic diagram of an example implementation of block 310. In particular, the device 104 may broadcast a request 400 for access point connection data from the nearby computing devices 128. The request 400 may be an undirected broadcast and to allow the request 400 to reach nearby computing devices 128 in any direction relative to the device 104.

Returning to FIG. 3, at block 315, the device 104 determines whether any responses have been received in response to the request broadcast at block 310. For example, after broadcasting the request at block 310, the device 104 may initiate a waiting period during which responses to the request may be expected. At the end of the waiting period, the device 104 may perform the determination at block 315.

Figure 5:
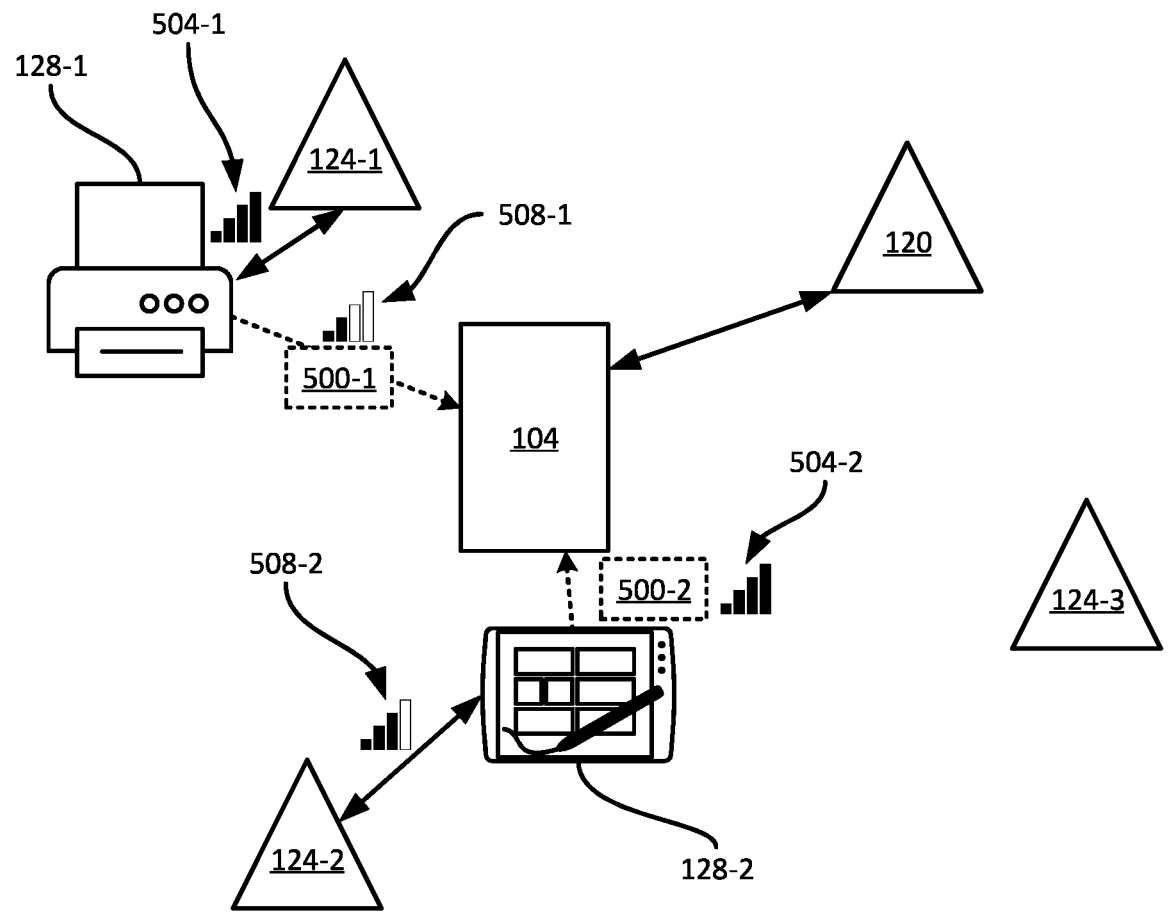
FIG. 5 is a schematic diagram of an example performance of receiving responses at block 315 of the method of FIG. 3.

For example, FIG. 5 depicts a schematic diagram of receiving responses at block 315. In particular, upon receiving the request 400, the device 128-1 may generate a response 500-1. The response 500-1 includes an identifier of the access point 124-1 and an indicator of a network signal strength 504-1 between the device 128-1 and the access point 124-1. The response 500-1 may be sent via the short-range communications protocol, and hence may additionally be associated with a short-range signal strength 508-1 between the device 128-1 and the device 104. In some examples, the short-range signal strength 508-1 may also be included with the response 500-1, while in other examples, the short-range signal strength 508-1 may be determined by the device 104 upon receipt of the response 500-1.

Similarly, upon receiving the request 400, the device 128-2 may generate a response 500-2 including an identifier of the access point 124-2 and an indicator of a network signal strength 504-2 between the device 128-2 and the access point 124-2. The response 500-2 may also be associated with a short-range signal strength 508-2 between the device 128-2 and the device 104.

Returning again to FIG. 3, if the determination at block 315 is negative, that is, no responses from nearby computing devices 128 were received, then the method 300 proceeds to block 320. At block 320, the device 104 may perform a roam scan in accordance with its existing protocols.

If the determination at block 315 is affirmative, that is, at least one response was received from a nearby computing device 128, then the method 300 proceeds to block 325. At block 325, the device 104 may filter the responses based on the access point connection data received in the response, such as parameters of the access point determined based on the access point identifier, the network signal strength, and the like. Additionally, the device 104 may filter the responses based on the short-range signal strength between the device 104 and the device 128 from which each response was received. For example, the device 104 may filter the responses which indicate a high network signal strength and a high short-range signal strength (e.g., above respective threshold strengths).

For example, in the example of FIG. 5, the short-range signal strength 508-1 may be below the threshold signal strength, and hence the response 500-1 and the corresponding access point 124-1 may be filtered out from the list of potential access points for the device 104. In other examples, the device 104 may filter the responses 500 based on the network signal strengths 504, combinations of the above, or other factors. For example, if the device 104 receives another response (not shown) from a device which is also connected to the access point 120, the device 104 may filter out said response on the basis that it does not provide a potential access point different from the current home access point 120 for the device 104.

After filtering the responses, the device 104 determines whether any potential access points identified by the responses remain. If the determination at block 325 is negative, that is that no potential access points remain, then the method 300 proceeds to block 320, where the device performs a roam scan in accordance with its existing protocols.

If the determination at block 325 is affirmative, that is, one or more access points remain, then the method 300 proceeds to block 330. At block 330, the device 104 ranks the list of potential access points. In particular, the device 104 may rank the potential access points using the network signal strength indicator and the short-range signal strength indicator for each response. For example, in the example of FIG. 5, the device 104 may rank the access point 124-2 higher than the access point 124-1 since the average signal strength of the network and short-range signals is higher for the device 128-2 than the device 128-1.

In some examples, the device 104 may apply weights to the network signal strength indicator and the short-range signal strength indicator according to predefined rules (e.g., stored in the memory 204) for ranking access points. For example, it may be preferable to connect to an access point identified by a device 128 which is closest to the device 104, and hence the device 104 may weight the short-range signal strength indicator higher. In another example, the device 104 may apply a higher weight to the network signal than the short-range signal, and hence in this case in the example of FIG. the access point 124-1 may be ranked higher than the access point 124-2 since the network signal strength 504-1 is higher than the network signal strength 504-2 and may outweigh the short-range signal strength 508-2 being higher than the short-range signal strength 508-1. In other examples, other factors and ranking mechanisms are also contemplated.

At block 335, after completing the ranking of the potential access points, the device 104 selects the top-ranked potential access point as the target access point to which to roam.

At block 340, the device 104 roams to the selected target access point. In particular, the device 104 may retrieve, from the response associated with the selected target access point, the access point identifier and any other access point connection data included in the response to facilitate roaming to the selected target access point. Thus, to roam to a new access point, the device 104 may select a target access point using access point connection data received from nearby computing devices over a separate short-range communications protocol and may move away from its home access point only when roaming, rather than while scanning as well. The reduction in time away from the network may improve network traffic and reduced lost packet data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device comprising:
a wireless communications interface configured to connect to a network deployed by a plurality of access points;
a short-range wireless communications interface configured to communicate with one or more nearby computing devices;
a processor interconnected with the wireless communications interface and the short-range wireless communications interface, the processor configured to:
obtain, from the one or more nearby computing devices via the short-range wireless communications interface, a list of potential access points, wherein each potential access point comprises one of the plurality of access points by which a respective nearby computing device is connected to the network;
select one of the potential access points as a target access point, wherein the target access point is different from a home access point to which the wireless communications interface is currently connected; and
control the wireless communications interface to roam to the selected target access point,
wherein,
to obtain the list of potential access points, the processor is configured to:
control the short-range wireless communications interface to broadcast a request for access point connection data from the one or more nearby computing devices,
receive responses from the one or more nearby computing devices, each response identifying the potential access point by which the respective nearby computing device is connected to the network, and
each response further includes a network signal strength indicator representing a network signal strength between the respective nearby computing device and the potential access point to which it is connected.

2. The mobile computing device of claim 1, wherein
the processor is configured to obtain the list of potential access points in response to detecting that a signal strength to the home access point is below a threshold strength.

3. The mobile computing device of claim 1, wherein, to select one of the potential access points, the processor is configured to rank the potential access points based on each network signal strength indicator, and a short-range signal strength indicator representing a short-range signal strength between the respective nearby computing device and the mobile computing device.

4. The mobile computing device of claim 3, wherein
the processor is configured to apply weights to each network signal strength indicator and each short-range signal strength indicator to rank the potential access points.

5. The mobile computing device of claim 1, wherein
the processor is configured to obtain an access point identifier of the selected target access point from the response associated with the selected target access point.

6. The mobile computing device of claim 1, wherein
each of the one or more nearby computing devices comprises one of: a printer, a laptop, a desktop computer, a fixed workstation, and another mobile computing device.

7. A method in a mobile computing device for roaming between a plurality of access points deploying a network, the method comprising:
obtaining, from one or more nearby computing devices via a short-range wireless communications interface, a list of potential access points, wherein each potential access point comprises one of the plurality of access points by which a respective nearby computing device is connected to the network;
selecting one of the potential access points as a target access point, wherein the target access point is different from a home access point to which the mobile computing device is currently connected; and
roaming to the selected target access point,
wherein obtaining the list of potential access points further comprises:
controlling the short-range wireless communications interface to broadcast a request for access point connection data from the one or more nearby computing devices, and
receiving responses from the one or more nearby computing devices, each response identifying the potential access point by which the respective nearby computing device is connected to the network and including a network signal strength indicator representing a network signal strength between the respective nearby computing device and the potential access point to which it is connected.

8. The method of claim 7, wherein
obtaining the list of potential access points is in response to detecting that a signal strength to the home access point is below a threshold strength.

9. The method of claim 7, wherein
selecting one of the potential access points comprises ranking the potential access points based on each network signal strength indicator, and a short-range signal strength indicator representing a short-range signal strength between the respective nearby computing device and the mobile computing device.

10. The method of claim 9, further comprising
applying weights to each network signal strength indicator and each short-range signal strength indicator to rank the potential access points.

11. The method of claim 7, further comprising
obtaining an access point identifier of the selected target access point from the response associated with the selected target access point.

12. The method of claim 7, wherein
each of the one or more nearby computing devices comprises one of: a printer, a laptop, a desktop computer, a fixed workstation, and another mobile computing device.

13. A non-transitory computer-readable medium storing a plurality of computer-readable instructions executable by a processor of a mobile computing device, wherein execution of the instructions configures the processor to:
obtain, from one or more nearby computing devices via a short-range wireless communications interface, a list of potential access points, wherein each potential access point comprises one of a plurality of access points by which a respective nearby computing device is connected to a network;
select one of the potential access points as a target access point, wherein the target access point is different from a home access point to which the mobile computing device is currently connected; and
roam to the selected target access point,
wherein,
to obtain the list of potential access points, execution of the instructions further configures the processor to:
control the short-range wireless communications interface to broadcast a request for access point connection data from the one or more nearby computing devices, and
receive responses from the one or more nearby computing devices, each response identifying the potential access point by which the respective nearby computing device is connected to the network and including a network signal strength indicator representing a network signal strength between the respective nearby computing device and the potential access point to which it is connected.

14. The non-transitory computer-readable medium of claim 13, wherein instructions further configure the processor to obtain the list of potential access points in response to detecting that a signal strength to the home access point is below a threshold strength.

15. The non-transitory computer-readable medium of claim 13, wherein, to select one of the potential access points, the instructions configure the processor to rank the potential access points based on each network signal strength indicator, and a short-range signal strength indicator representing a short-range signal strength between the respective nearby computing device and the mobile computing device.

16. The non-transitory computer-readable medium of claim 15, wherein the instructions further configure the processor to apply weights to each network signal strength indicator and each short-range signal strength indicator to rank the potential access points.

17. The non-transitory computer-readable medium of claim 13, wherein the instructions further configure the processor to obtain an access point identifier of the selected target access point from the response associated with the selected target access point.

18. The non-transitory computer-readable medium of claim 13, wherein each of the one or more nearby computing devices comprises one of: a printer, a laptop, a desktop computer, a fixed workstation, and another mobile computing device.

* * * * *